United States Patent [19]
Rendall et al.

[11] Patent Number: 5,746,932
[45] Date of Patent: May 5, 1998

[54] METHOD FOR PRODUCING THERMAL INSULATION FROM DRY-FINE OIL-SANDS TAILINGS

[75] Inventors: John S. Rendall; Massoud Ahghar, both of Albuquerque, N. Mex.

[73] Assignee: Solv-Ex Corporation, Albuquerque, N. Mex.

[21] Appl. No.: 749,167

[22] Filed: Nov. 14, 1996

[51] Int. Cl.$^6$ ........................................... E04B 1/74
[52] U.S. Cl. ........................... 252/62; 501/128; 501/133; 423/328.1; 423/328.2
[58] Field of Search ............................ 252/62; 423/328.1, 423/328.2; 501/127, 128, 133, 80

[56] References Cited

U.S. PATENT DOCUMENTS 4,221,672   9/1980   McWilliams et al. ................. 252/62
4,792,466  12/1988   McWilliams et al. ................. 427/177

Primary Examiner—Paul Marcantoni
Attorney, Agent, or Firm—Thomas E. Schatzel; Law Offies of Thomas E. Schatzel a prof. corporation

[57] ABSTRACT

A method of making low-density silica-alumina thermal insulation wherein sulfuric acid is used to leach clay fines from processed Athabasca oil sands. The treated fines are dried and roasted to produce a fine buff to white colored powder with particle sizes that range from forty microns to less than a micron. About 80% of these particles are less than twenty microns. The bulk density of this powder is about fifteen to thirty-five pounds to the cubic-foot (lb./ft$^3$), compared to silica sand which has a bulk density of 150 lb./ft$^3$, and alumina which is about 200 lb./ft$^3$, depending on the grade and method of production.

6 Claims, 1 Drawing Sheet

METHOD FOR PRODUCING THERMAL INSULATION FROM DRY-FINE OIL-SANDS TAILINGS

BACKGROUND OF THE INVENTION

1. Field of the Invention

The invention relates generally to thermal insulation and specifically to methods for producing silica and alumina thermal insulation from the dry-fine oil-sands tailings or similar ore.

2. Description of the Prior Art

Expensive chemical processes are used in the separate synthetic productions of silica and alumina. Pure products of each are produced, and yet some applications, e.g., ceramics and insulators, require combinations of both. Particle sizes which range from forty microns to under one micron are commonly used in such applications.

Synthetic silica is conventionally produced by the vapor phase hydrolysis of anhydrous silicon tetrachloride and oxygen. Alumina is typically prepared from bauxite.

Conventional thermal insulation made from silica and alumina is generally limited to 1000° C. to 1200° C., and higher temperature limits are desirable. For example, see, U.S. Pat. No. 4,221,672, issued Sep. 9, 1980, to Joseph A. McWilliams, which says that the highest temperature to which insulating materials can be used in practice can be increased by incorporating alumina into their makeups. McWilliams describes a heat insulating material comprised of an intimate mixture of microporous silica aerogel and reinforcing fibers. Up to twelve percent, by weight, of the mixture is alumina. Such thermal insulation is said to suffer less shrinkage at high temperatures compared to prior materials. The highest temperature limit is extended by as much as 100° C., and then showing only minimal shrinkage. For example, the materials of McWilliams invention are said to be useful at temperatures as high as 1100° C. to 1200° C. without serious shrinkage due to sintering.

According to an earlier U.S. Pat. No. 4,792,466, issued Dec. 20, 1988, to McWilliams, microporous thermal insulation materials are materials which have a lattice structure in which the average interstitial dimension is less than the mean free path of the molecules of air or other gas in which the material is arranged. This results in a heat flow which is less than that attributable to the molecular heat diffusion of air or other gas in which the material is used. The lattice structure is created within a powder material by using a powder with very fine particles in a chain-like formation which adhere to each other. Suitable powders include finely divided silica, e.g., silica aerogel or pyrogenic silica. Such powders are strengthened by ceramic and other reinforcing fibers. An opacifier is added for infrared opacification. Microporous thermal insulation materials are formed into panels by compression, but are friable and readily broken, because the material refuses to bond well to other substrates.

Synthetic silica gel can provide for an effective insulator. Finely-divided silica gels are often obtained by flame hydrolysis, wherein volatile silicon compounds such as silicon tetrachloride are decomposed in a detonating gas flame. The result is primary particles that can be agglomerated into particulate aggregates. But such materials have a heat conductivity that directly increases with temperature. The best insulation therefore requires a dusting of particles, but such loose beds are not stable. Silica aerogels are better, but not fully satisfactory, and are obtained by precipitating silica from sodium silicate with an acid. The ionic constituents are washed out of the hydrogel with water. The water is then displaced by methanol or other low-boiling water-soluble organic liquids. The resulting alcogel and liquid are heated under supercritical pressure to supercritical temperature. The liquid is removed by flash vaporization at the supercritical temperature. The water-soluble liquid can be substituted by a water-insoluble organic liquid or liquid carbon dioxide prior to such supercritical drying.

Large-pored silica aerogels formed in the course of the drying process can be ground into particles for relatively mechanically stable product. Such stability means that the bed volumes do not vary much and highly insulating structures can be made. The barrier effect provided by aerogels against contact heat is virtually temperature independent. However, infrared radiation transmission increases with increasing temperature, so silica gels are conventionally mixed with pigments to scatter, absorb and reflect the infrared. But adding uniform pigment concentrations in the insulating layer is technically difficult, especially when reinforcing ceramic fibers need to be added too. Pigment-containing finely divided silica can be made by the direct coagglomeration of components during or after decomposition by flame hydrolysis.

SUMMARY OF THE PRESENT INVENTION

It is therefore an object of the present invention to provide a process for making thermal insulation.

It is a further object of the present invention to provide a process for making low-density synthetic silica-alumina powder from oil-sands tailings.

Briefly, in a preferred method embodiment of the present invention, sulfuric acid is used to leach clay fines from processed Athabasca oil sands. The treated fines are dried and roasted to produce a fine buff to white colored powder with particle sizes that range from forty microns to less than a micron. About 80% of these particles are less than twenty microns. The bulk density of this powder is about fifteen to thirty-five pounds to the cubic-foot (lb./ft$^3$), compared to silica sand which has a bulk density of 150 lb./ft$^3$, and alumina which is about 200 lb./ft$^3$, depending on the grade and method of production.

A further advantage of the present invention is that a method is provided for inexpensively making thermal insulation.

Another advantage of the present invention is that a method is provided for making low-density silica-alumina powder from oil-sands tailings.

These and other objects and advantages of the present invention will no doubt become obvious to those of ordinary skill in the art after having read the following detailed description of the preferred embodiments that are illustrated in the various drawing figures.

IN THE DRAWINGS

FIG. 1 is a flowchart diagram of a method embodiment of the present invention for making low-density silica-alumina thermal insulation.

DETAILED DESCRIPTION OF THE PREFERRED EMBODIMENTS

Figure 1:
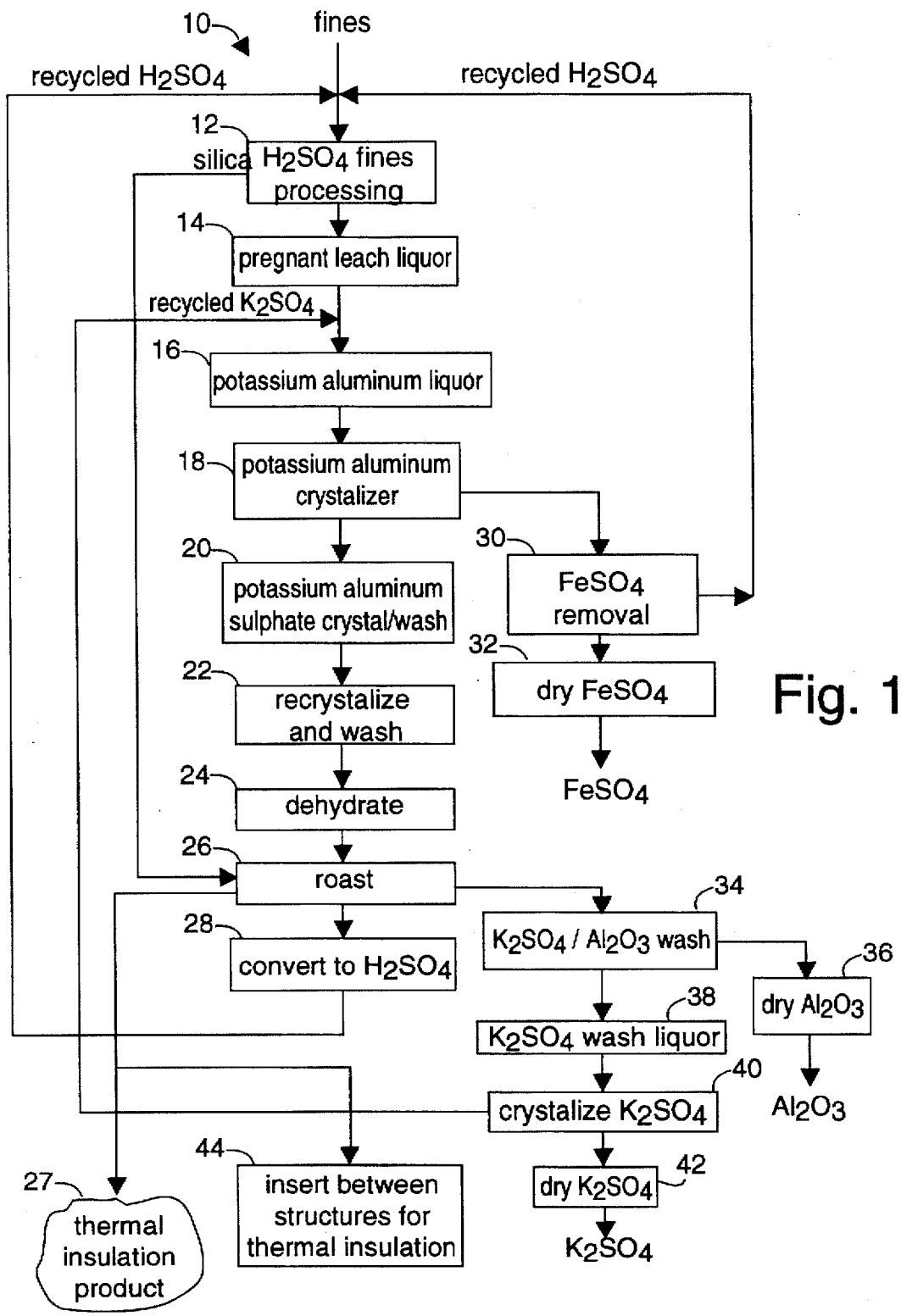

FIG. 1 illustrates a process embodiment of the present invention for making silica-alumina thermal insulation, the process referred to herein by the general reference numeral 10. A general background that will help in understanding and aid in the construction of embodiments of the present invention is described by one of the present inventors, John Rendall, in U.S. Pat. No. 5,387,276, issued Feb. 7, 1995, and is incorporated herein by reference.

The process 10 includes a step 12 in which fines from dry tailings of oil sands bitumen production, or other ores, are combined in a mixer with makeup and recycled sulfuric acid ($H_2SO_4$), e.g., as obtained from later steps in the process. In a step 14 a pregnant leach liquor of crystals from the mixer in step 12 is held in a tank at 95° C. These are pumped out of the tank to join a mixture of recycled $K_2SO_4$ in a step 16 which forms a potassium aluminum liquor maintained at 85° C. Such liquor includes the double salt of potassium aluminum sulfate ($KAl(SO_4)_2$). A step 18 uses a crystallizer operated at 50° C. to produce granular crystals that are 100 to 150 mesh. A step 20 washes these granular crystals in a screen bowl centrifuge and produces a hydrous potassium aluminum sulfate ($KAl(SO_4)_2+12\ H_2O$). A step 22 increases the concentration and purity of the materials by dissolving in clean water and recrystallizing the hydrous potassium aluminum sulfate ($KAl(SO_4)_2+12\ H_2O$). The step 22 produces crystals that are 100 to 150 mesh. A step 24 dehydrates these crystals by driving off the water, e.g., using an indirect-heated rotary drum.

A roasting step 26 produces a thermal insulation product 27, a gas output comprising sulfur dioxide ($SO_2$) and sulfur trioxide ($SO_3$), and another output of potassium sulfate ($K_2SO_4$) and alumina ($Al_2O_3$). The roasting step 26 may include the use of an indirect-fired rotary kiln operated at 850° C. to 1200° C. The input materials to the step 26 are calcinated to remove the sulfate radical from the aluminum sulfate in order to secure a silica/alumina mixture which constitutes the thermal insulation product 27. As such, about any rate of heating above 850° C. will provide satisfactory results. Such thermal insulation product 27 is about 80% to 90% amorphous silica ($SiO_2$) by weight and eight percent to twenty percent alumina ($Al_2O_3$) by weight. Such silica content can run as high as 90% with corresponding decreases in the other constituents. Test runs have demonstrated a specific surface area of 60 to 80 square meters per gram, a bulk density of 0.25 to 0.55 gm/cc or thirty-five pounds per cubic foot (lb/ft$^3$), a size distribution of 0.1 to 40.0 microns with 80% less that twenty microns in diameter, a pH of 6.5 to 6.8, and a white to rust color. Conventional processes can be used to foam or cast the thermal insulation product 27 into high-temperature-use panels and wraps.

A step 28 converts the sulfur dioxide ($SO_2$) and sulfur trioxide ($SO_3$) gases into sulfuric acid ($H_2SO_4$) and returns the conversion product to step 12. A step 30 receives a liquor from the step 18 and removes iron sulfate ($FeSO_4$). This leaves essentially nothing but sulfuric acid ($H_2SO_4$) which is returned to step 12. A step 32 dries the iron sulfate ($FeSO_4$) and the result can be sold on the commercial market. A step 38 receives a potassium sulfate ($K_2SO_4$) and alumina ($Al_2O_3$) liquor from step 34 and washes out the alumina ($Al_2O_3$) with water. A step 36 dries the alumina ($Al_2O_3$) that was removed from the liquor in step 34 and produces a pure alumina product suitable for sale. A step 40 cools the wash from step 38 and thus crystallizes out potassium sulfate ($K_2SO_4$). The liquid which is left still has some potassium sulfate ($K_2SO_4$) and is returned to step 16. A step 42 is used to dry the crystals of potassium sulfate ($K_2SO_4$) and are salable on the open market after being bagged.

In an alternative embodiment of the present invention, e.g., a method for thermally insulating structures from one another, a step 44 follows step 26 and the product 27 is cast, foamed or otherwise inserted between two structures for thermal insulation.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for thermally insulating structures from one another, comprising the steps of:

mixing dry oil sands tailings with sulfuric acid;

processing said mixture of oil sands tailings and sulfuric acid to produce a silica-alumina powder; and placing said silica-alumina powder between structures to be thermally insulated from one another;

wherein the step of processing includes:

adding potassium sulfate to form a potassium aluminum liquor;

crystallizing said potassium aluminum liquor to produce potassium aluminum sulfate crystals;

washing said potassium aluminum sulfate crystals;

recrystallizing said washed potassium aluminum sulfate crystals;

dehydrating said recrystallized potassium aluminum sulfate crystals; and roasting said dehydrated potassium aluminum sulfate crystals at greater than .850° C. to drive-off sulfur, wherein a synthetic silica-alumina powder having about 80% to 90% silica by weight and 8% to 20% alumina by weight is produced as a result, wherein the synthetic silica processed contains 60% to 70% amorphous silica and remaining crystalline silica.

2. The method of claim 1, wherein:

the step of roasting drives off sulfur that is converted to sulfuric acid that is recycled to the step of mixing.

3. The method of claim 1, wherein:

the roasting of said dehydrated potassium aluminum sulfate crystals produces a powder with particle sizes that range from forty microns to less than a micron, wherein about 80% of these particles are less than twenty microns, and the bulk density of said powder is about fifteen to thirty-five lb./ft$^3$.

4. A method for making thermal insulation, the method comprising the steps of:

mixing dry-fine oil-sand tailings that include silica ($SiO_2$) and alumina ($Al_2O_3$) with sulfuric acid ($H_2SO_4$) and maintaining said mixture at about 95° C.;

adding potassium sulfate ($K_2SO_4$) to said mixture of dry-fine oil-sand tailings and sulfuric acid to form a potassium aluminum sulfate ($KAl(SO_4)_2$) liquor and maintaining said liquor at about 85° C.;

crystallizing said potassium aluminum sulfate ($KAl(SO_4)_2$) liquor to produce potassium aluminum sulfate crystals;

washing said potassium aluminum sulfate crystals wherein hydrous potassium aluminum sulfate ($KAl(SO_4)_2+12\ H_2O$) is produced;

recrystallizing said hydrous potassium aluminum sulfate ($KAl(SO_4)_2+12\ H_2O$) crystals wherein crystals of potassium aluminum sulfate ($KAl(SO_4)_2$) are produced;

dehydrating said recrystallized potassium aluminum sulfate ($KAl(SO_4)_2$) crystals; and roasting said dehydrated potassium aluminum sulfate crystals plus silica, wherein a synthetic silica-alumina ($SiO_2+Al_2O_3$) powder, having about 80% to 90% silica by weight and 8% to 20% alumina by weight, is produced as a result;

wherein, the step of roasting includes raising the temperature to 850° C. to 1200° C. in order to drive off about all the sulfur as a gas ($SO_2$, $SO_3$).

5. The method of claim 4, wherein:

the step of roasting drives off sulfur and the driven-off sulfur ($SO_2$, $SO_3$) is converted to sulfuric acid ($H_2SO_4$) that is recycled to the step of mixing.

6. The method of claim 4, wherein:

the roasting of said dehydrated potassium aluminum sulfate crystals and synthetic silica produces a powder ($SiO_2+Al_2O_3$) with particle sizes that range from forty microns to less than a micron, wherein about 80% of these particles are less than twenty microns, and the bulk density of said powder is about fifteen to thirty-five lb./ft$^3$.

* * * * *